US008885315B2

(12) United States Patent  
Harke

(10) Patent No.: US 8,885,315 B2  
(45) Date of Patent: Nov. 11, 2014

(54) MULTI-ACTUATOR MOTION CONTROL SYSTEM

(75) Inventor: Michael C. Harke, Madison, WI (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 666 days.

(21) Appl. No.: 12/579,592

(22) Filed: Oct. 15, 2009

(65) Prior Publication Data

US 2011/0089884 A1   Apr. 21, 2011

(51) Int. Cl.
*H01H 47/00* (2006.01)
*G05B 19/404* (2006.01)
*G05B 5/01* (2006.01)
*H02P 7/00* (2006.01)

(52) U.S. Cl.
CPC .... *G05B 19/404* (2013.01); *G05B 2219/43171* (2013.01); *G05B 2219/43162* (2013.01)
USPC ............................ 361/139; 318/624; 318/432

(58) Field of Classification Search
CPC ....................................................... B64C 13/42
USPC .................................. 361/139; 318/624, 432
See application file for complete search history.

(56) References Cited

U.S. PATENT DOCUMENTS

| 4,387,431 A | 6/1983 | Wright et al. |
|---|---|---|
| 4,531,448 A | 7/1985 | Barnes |
| 4,800,798 A | 1/1989 | Boldrin et al. |
| 5,366,176 A | 11/1994 | Loewy et al. |
| 5,659,480 A | 8/1997 | Anderson et al. |
| 5,670,856 A | 9/1997 | Le et al. |
| 5,806,805 A | 9/1998 | Elbert et al. |
| 5,992,383 A * | 11/1999 | Scholten et al. ............... 123/399 |
| 6,227,481 B1 | 5/2001 | Fenny et al. |
| 6,314,952 B1 * | 11/2001 | Turin et al. ..................... 123/673 |
| 6,511,292 B2 | 1/2003 | Perkinson et al. |
| 7,059,563 B2 | 6/2006 | Huynh |
| 7,270,141 B2 * | 9/2007 | Dykstra ........................... 137/92 |
| 2008/0252076 A1 * | 10/2008 | Fortmann et al. ............... 290/44 |
| 2010/0127132 A1 * | 5/2010 | Kirkland ..................... 244/76 R |

OTHER PUBLICATIONS

Lorenz et al., "Synchronized Motion Control for Process Automation," IEEE Transactions on Industry Applications, 1989, pp. 1693-1698.

Valenzuela et al., "Electronic Line-Shafting Control for Paper Machine Drives," IEEE Transactions on Industry Applications, vol. 37, No. 1, Jan./Feb. 2001, pp. 158-164.

Anderson et al., "Web Machine Coordinated Motion Control Via Electronic Line-Shafting," IEEE Transactions on Industry Applications, vol. 37, No. 1, Jan./Feb. 2001, pp. 247-254.

* cited by examiner

*Primary Examiner* — Jared Fureman  
*Assistant Examiner* — Lucy Thomas  
(74) *Attorney, Agent, or Firm* — Carlson, Gaskey & Olds, P.C.

(57) ABSTRACT

A multi-actuator motion control system includes a control methodology that coordinates the motion of multiple actuators while limiting the force-fight between the actuators. Control logic is provided in a relative coordinate system that allows control of the mean actuator position. Force-fight between the actuators is decoupled from the actuator position by estimating load forces on the actuator using reduced-order observers.

17 Claims, 5 Drawing Sheets

MULTI-ACTUATOR MOTION CONTROL SYSTEM

STATEMENT REGARDING FEDERALLY SPONSORED RESEARCH OR DEVELOPMENT

This invention was made with government support with the United States Air Force under Contract No.: FA8650-07-C-2803. The government therefore has certain rights in this invention.

BACKGROUND

This disclosure relates to a multi-actuator motion control system that minimizes force-fight amongst the actuators.

One example multi-actuator motion control system uses at least two electromechanical actuators (EMAs) that are connected to a synchronization ring. The force outputs of the two actuators are summed to manipulate the position of the synchronization ring, which in turn moves an actuated element. In one example, the position of the synchronization ring is regulated using position sensors integrated into each actuator and in communication with a controller. If the controller considers only the position regulation of the individual EMAs, then errors in position measurement will lead to "force-fight" between the actuators resulting in additional losses and component stress including distortion of the synchronization ring.

The motion of multi-actuator systems can be coordinated by providing the same command vectors to each actuator, resulting in independent controllers that do not compensate each others' behavior. Errors in position measurement or disturbances lead to force-fight between the actuators. In one example master-slave system, one actuator is designated the master, around which the position controller is developed referencing the commanded position. The position controller for the second actuator uses the output (feedback) of the first actuator as its reference. The main drawback to such a system is that a disturbance applied to the second actuator is not reflected to the first actuator. A relative stiffness motion control block can be added to provide feedback to the master controller, resulting in a relative stiffness motion controller coupling the motion response of the two actuators, but force-fight is not addressed.

In another example system, two additional position sensors are used to detect twist along a drive shaft between two actuators. A feedback regulator on one of the actuators is used to eliminate the twist. This arrangement creates a master-slave system using active relative stiffness feedback. The position of the primary system is regulated to the command and the second system is regulated to minimize the twist in the interconnecting drive shaft. Disadvantages of this method include the use of additional sensors to detect the force-fight and that errors between the two actuator sensors command force-fight, which is then compensated by the relative stiffness loop.

SUMMARY

A motion controller system includes a control methodology that coordinates the motion of multiple actuators while limiting the force-fight between the actuators. In one example, first and second actuators are operatively coupled to a common drive element and are respectively configured to provide first and second actuator forces to the common drive element.

Control logic is provided in a relative coordinate system, for example, that allows control of a mean actuator position. A controller is configured to include relative motion state control logic providing mean and differential motion state regulators for providing first and second actuator force command signals respectively to the first and second actuators. The controller is configured to include reaction force observer logic providing estimated mean and differential reaction force observers that are respectively in communication with the mean and differential motion state regulators for estimating first and second actuator forces. The mean and differential motion state regulators minimize a differential between the first and second actuator forces. In this manner, force-fight between the actuators is decoupled from the actuator position by estimating load forces on the actuator using reduced-order observers.

BRIEF DESCRIPTION OF THE DRAWINGS

The disclosure can be further understood by reference to the following detailed description when considered in connection with the accompanying drawings wherein.

DETAILED DESCRIPTION

Figure 1:
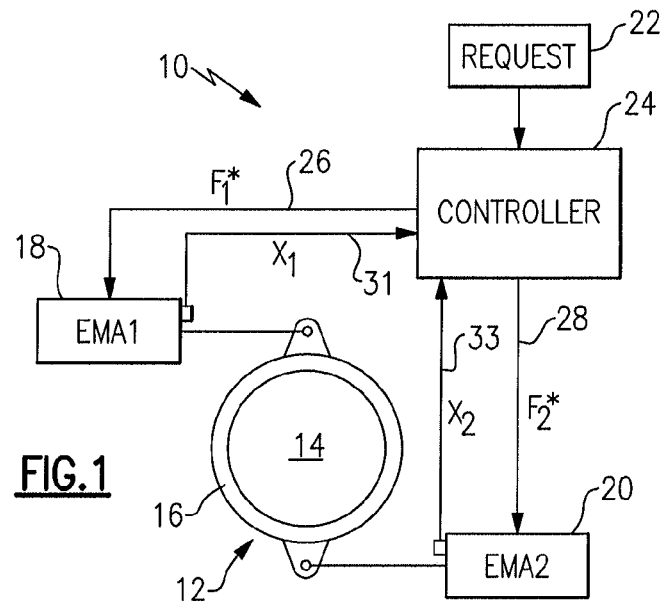
FIG. 1 is a schematic view of an example motion control system.

FIG. 1 schematically illustrates a motion control system 10 having multiple actuators. The system 10 includes an actuated element 12, which includes a synchronization ring 16 coupled to a shaft 14 in the example, although other configurations may be used. First and second actuators (EMAs) 18, 20 are coupled to the synchronization ring 16 to move the actuated element 12 to a desired position in cooperation with one another. It should be understood that more than two actuators may be used.

An actuator request input 22 is provided to a controller 24 that coordinates the operation of the first and second actuators 18, 20. The controller 24 may be a single unit or multiple units physically separated from one another but in communication with one another. The controller 24 provides control methodology to limit the force-fight between the first and second actuators 18, 20. The controller 24 includes hardware and/or software programmed with the disclosed control methodology. Control signals are indicated in the Figures using arrowed lines.

First and second actuator force command signals 26, 28 are respectively provided to the first and second actuators 18, 20. Torque regulation of the actuator motors may be provided, for example, in the form of a current regulator. The gear ratios of the rotational to translational transmission determine the scaling of the torque and force, as well as the scaling between the rotor angle and linear position. In response to the first and second actuator force command signals 26, 28, the first and second actuators 18, 20 move the synchronization ring 16 to a desired position. Each of the first and second actuators 18, 20 include a position sensor that provides first and second actuator measured position signals 31, 33 to the controller 24 to provide feedback as to whether the first and second actuators 18, 20 have achieved the desired position from the actuator request input 22.

Below are the parameters as well as the corresponding element number used to represent the signals in the Figures.

$F_1^*$, first actuator force command (26)
$F_2^*$, second actuator force command (28)
$X_1$, first actuator measured position (31)
$x_2$, second actuator measured position (33)
$F_{da1}$, first actuator disturbance force (34)
$F_{da2}$, second actuator disturbance force (36)
$F_{r1}$, first actuator reaction force (38)
$F_{r2}$, second actuator reaction force (40)
$F_{ds}$, disturbance force from actuated element (41)
$\bar{x}^*$, mean position command (48)
$\bar{x}$, mean position (50)
$G_{\bar{x}}(s)$, mean state motion controller (52)
$\bar{F}^*$, mean force command (54)
$\Delta x^*$, differential position command (56)
$\Delta x$, differential position (58)
$G_\Delta(s)$, differential state motion controller (60)
$\Delta F^*$, differential force command (62)
$\bar{F}_a^*$, mean actuator force command (72)
$\Delta F_a^*$, differential actuator force command (74)
1/s, continuous time domain integral (Laplace) (80)
$k_{io}$, observer integral gain (82, 132)
$k_{so}$, observer position gain related to stiffness (84, 134)
$c_o$, observer velocity gain related to damping (86, 136)

$$\frac{1}{\hat{M}},$$

inverse of estimated equivalent mass (90, 140)
$\hat{\dot{x}}$, estimated mean velocity (98)
$\hat{\bar{x}}$, estimated mean position (102)
$\hat{\bar{F}}$, estimated mean force (106)
$x^*$, position command (108)
$\dot{x}^*$, velocity command (110)
$\ddot{x}^*$, acceleration command (112)
$\Delta F$, differential force
$\hat{M}$, estimated equivalent mass (118)
$k_{ia}$, regulator integral gain (122, 170)
$k_{sa}$, regulator position gain related to stiffness (124, 164)
$C_a$, regulator velocity gain related to damping (126, 162)
$\bar{F}_{cff}^*$, mean feed forward force command (120)
$\bar{F}_{fdbk}^*$, mean feedback force command (128)
$\Delta \hat{\ddot{x}}$, estimated differential acceleration (142)
$\Delta \hat{\dot{x}}$, estimated differential velocity (148)
$\Delta \hat{x}$, estimated differential position (152)
$\Delta \hat{F}$, estimated differential force (156)
$\Delta \dot{x}^*$, differential velocity command (158)

$$\frac{T}{1-z^{-1}},$$

discrete-time integrator (168)
$\Delta F_{fdbk}^*$, estimated differential feedback force (172)
$\bar{F}$, mean force The disclosed motion control system 10 provides the ability to incorporate system requirements such as position matching or force-fight specifications into the control methodology. Secondly, the control regulation is based on the state of primary importance: the mean position of the actuators, which is related to the position of synchronization mechanism.

Figure 2:
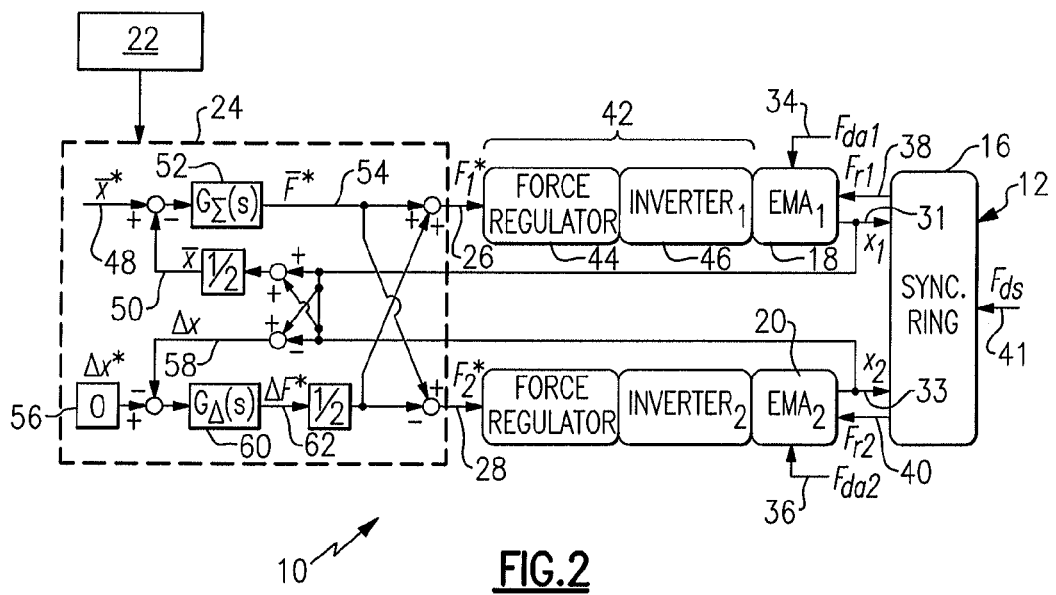
FIG. 2 is a high-level schematic of a control methodology used to coordinate the motion of multiple actuators.
Figure 3:
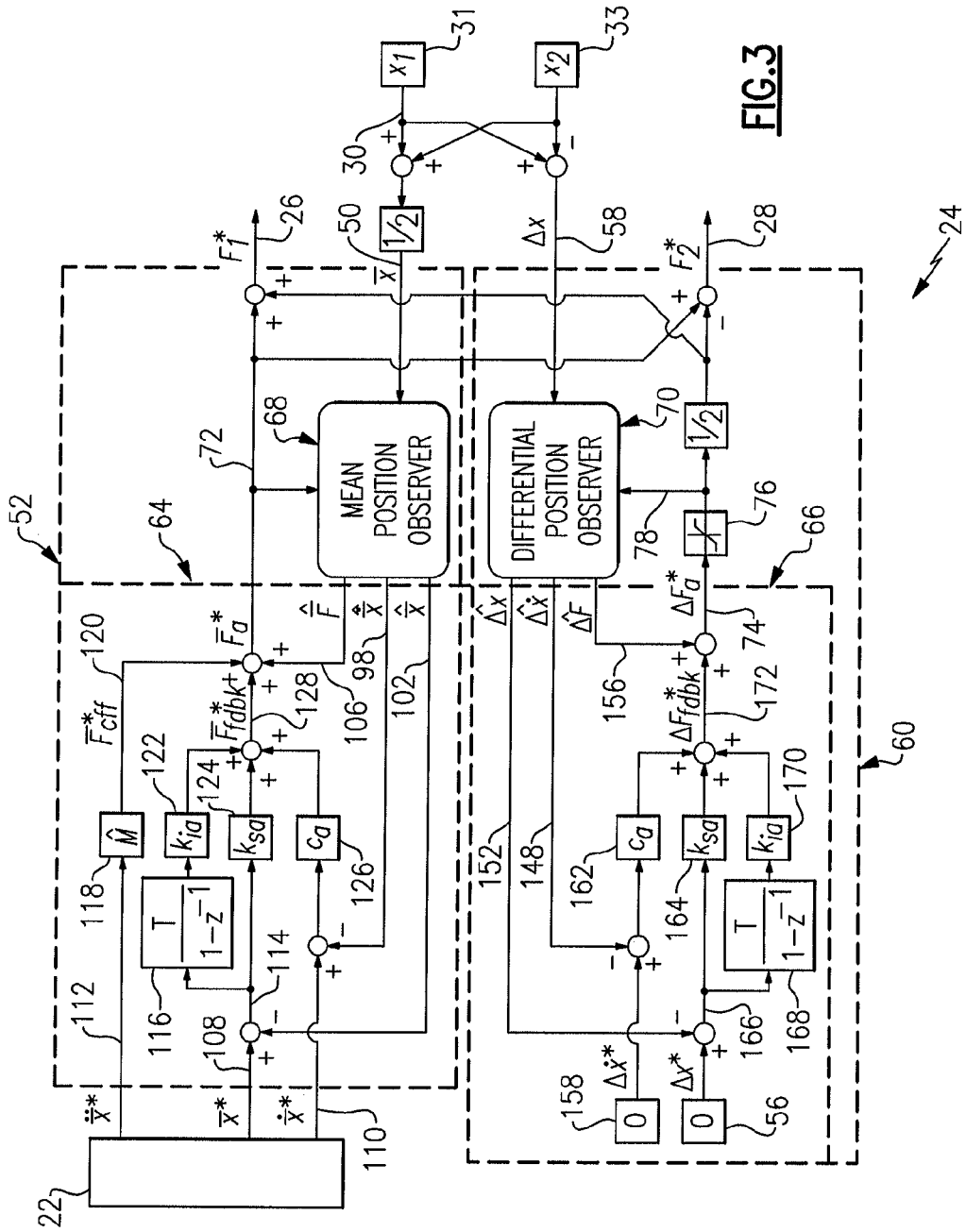
FIG. 3 is a more detailed schematic of the control logic shown in FIG. 2.

A basic block diagram of the relative state motion controller consists of two cross-coupled EMA systems, depicted in FIGS. 2 and 3. Since there are two degrees of freedom in the EMA output, two relative motion state logic controllers, provided by a mean state motor controller 52 and a differential motion state controller 60, are used to fully constrain the system. The mean state motor controller 52 includes a mean state motion regulator 64, which is used to generate the mean force command $\bar{F}^*$ 54. The differential motion state controller 60 is used to generate differential force command $\Delta F^*$ 62 (force-fight) using a differential state regulator 66. This creates a control state that allows monitoring and limitation of force-fight. In this case, the command for the differential state motion controller is zero (indicated as the differential position command 56), but it could be non-zero depending on the application.

Figure 4A:
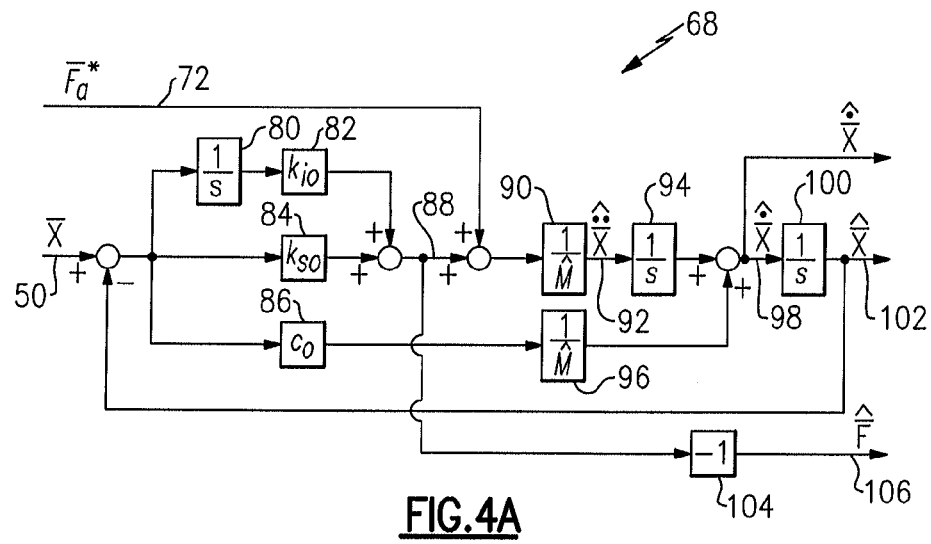
FIG. 4A is a more detailed schematic of a mean reaction force observer, which is shown in FIG. 3.
Figure 4B:
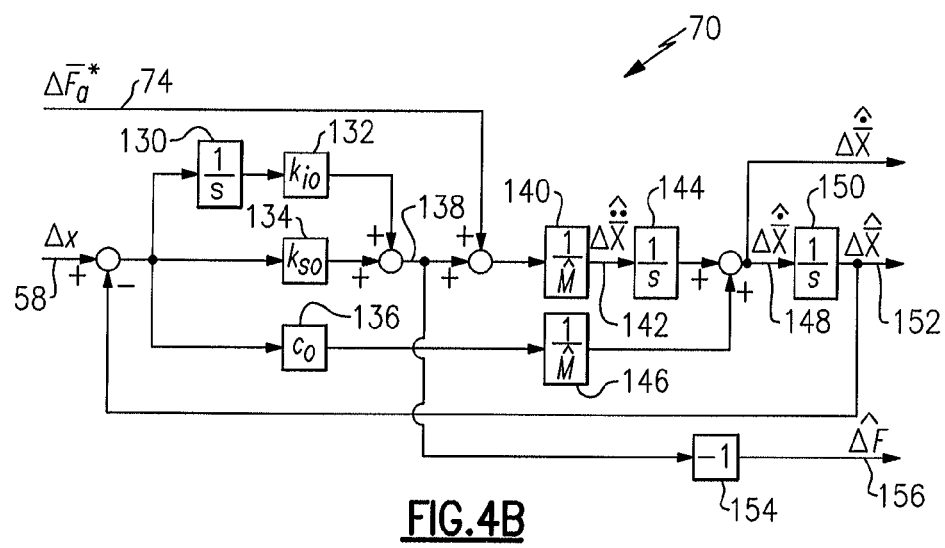
FIG. 4B is a more detailed schematic of a differential reaction force observer, which is shown in FIG. 3.

Referring to FIG. 2, the disturbance and reaction forces $F_{da1}, F_{da2}, F_{r1}$ and $F_{r2}$ (34, 36, 38, 40) applied to the EMAs 18, 20 can be estimated and decoupled using an observer (68, 70 in FIGS. 3-4B). In a similar fashion to the regulators 64, 66, the observers 68, 70 can be constructed in either the absolute or relative coordinate system. In this case, it is desirable to construct the observers 68, 70 in the relative coordinate system. For example, a differential position observer 70 estimates the differential motions states and the differential force $\Delta \hat{F} = (\hat{F}_{da1} - \hat{F}_{da2} + \hat{F}_{r1} - \hat{F}_{r2})$ based up on a measured differential position $\Delta x$ (58), commanded differential force $\Delta F^*$ (78) and an equivalent mass estimate $\hat{M}$ (140, 146) of the EMA, as shown in FIG. 4B. The corresponding mean position observer 68 has an identical structure in the example, but uses the mean position and mean force command as inputs, as shown in FIG. 4A.

Returning to FIG. 2, the controller 24 is shown in more detail. A first actuator disturbance force 34 and a first actuator reaction force 38 is transmitted to the first actuator 18 as the first actuator 18 moves the synchronization ring 16. Similarly, the second actuator 20 receives second actuator disturbance forces 36 and second actuator reaction forces 40 from the synchronization ring 16. The first and second actuator reaction forces 38, 40 are generated by disturbance forces 41 from the actuated element. Position sensors provide first and second actuator measured positions 31, 33 used by the controller 24 to coordinate the first and second actuators 18, 20.

More specifically, a mean state motion controller 52 receives a mean position command 48 and a mean position 50 that are combined with one another. The mean position command 48 corresponds to position related information from the actuator request input 22. A mean force command 54 is provided by the mean state motion controller 52 that together with a differential force command 62 is used to produce the first actuator force command 26.

A differential state motion controller 60 receives a differential position command 56 combined with a differential position 58 to produce the differential force command 62. The second actuator force command 28 is produced based upon the combination of the mean force command and the differential force command.

A signal processing circuit 42 including a regulator 44 and an inverter 46 receives and conditions the force commands 26, 28 before providing the force command 26, 28 to the EMAs.

The overall motion control system 10 consists of a mean state regulator 64, a differential state regulator 66 and their respective observers 68, 70, as shown in FIG. 3. The mean state regulator 64 has a feedback force command signal 128, a feed-forward command signal 120 and estimated mean force 106 decoupling. The differential state regulator 66 is similar to the mean state regulator 64 with the exceptions that the feed-forward command signal is omitted due to the assumption of a zero differential acceleration command and the differential actuator force command 74 is limited. The command vector for the mean state regulator is developed using a command state filter associated with the actuation request input 22.

The mean state motion controller 52 and differential state motion controller 60 are shown in more detail in FIG. 3. The disclosed control system can be broken into two parts. First, the relative state motion controllers 52, 60 are used to synchronize the motion of multiple actuators. Second, observers are used to estimate the reaction force on the EMAs so that the reaction forces can be decoupled and monitored.

The mean state motion controller 52 includes a mean state regulator 64 that cooperates with a mean position observer 68 to produce a mean actuator force command signal 72. The differential state motion controller 60 includes a differential state regulator 66 that cooperates with a differential position observer 70 to produce a differential actuator force command signal 74. The mean and differential position observers 68, 70 are illustrated in more detail in FIGS. 4A and 4B respectively.

Referring to FIG. 4A, the mean position 50 is combined with an estimated mean position signal 102 produced from a PID controller. In the example, the mean position 50 is provided to observer integral, position, and velocity gain co-efficients 82, 84, 86. The mean position 50 is provided to the observer integral gain co-efficient 82 and integrated 80. Outputs from the observer integral gain and observer position gain co-efficients 82, 84 are combined to produce a combined mean integral and position gain value 88, which is combined with the mean actuator force command signal 72. This combined signal is further processed by the inverse of the estimated equivalent mass 90 to produce the estimated mean acceleration 92. The integral 94 applied to the estimated mean acceleration 92, when combined with the observer velocity gain co-efficient 86 applied to the inverse of estimated equivalent mass 96, provides the estimated mean velocity 98. The integral 100 applied to the estimated mean velocity 98 provides the estimated mean position 102. The combined mean integral and position gain value, when one is subtracted 104, produces the estimated mean force 106.

Referring to FIG. 4B, the differential position command signal 58 is combined with an estimated differential position signal 152 produced from a PID controller. In the example, the differential position 58 is provided to observer integral, position, and velocity gain co-efficients 132, 134, 136. The differential position command signal 58 is provided to the observer integral gain co-efficient 132 and integrated 130. Outputs from the observer integral gain and observer position gain co-efficients 132, 134 are combined to produce a combined differential integral and position gain value 138, which is combined with the differential actuator force command 74. This combined signal is further processed by the inverse of the estimated equivalent mass 140 to produce the estimated differential acceleration 142. The integral 144 applied to the estimated differential acceleration 142, when combined with the observer velocity gain co-efficient 136 applied to the inverse of estimated equivalent mass 146, provides the estimated differential velocity 148. The integral 150 applied to the estimated differential velocity 148 provides the estimated differential position 152. The combined differential integral and position gain value, when one is subtracted 154, produces the estimated differential force 156.

Returning to FIG. 3, the mean state regulator 64 receives the estimated mean velocity signal 98, estimated mean position signal 102 and estimated mean force 106 along with the position-related signals from the actuator request input 22 (mean position command 108, mean velocity command 110 and mean acceleration command 112) to produce the mean actuator force command 72.

In the example, the mean state regulator 64 combines a mean feed-forward force command 120 with a mean feedback force command 128 to produce the mean actuator force command 72. The mean feed-forward force command 120 is produced by applying an estimated equivalent mass 118 to the mean acceleration command 112. The mean feedback force command 128 is produced based upon the regulator integral gain 122, a regulator position gain 124 and a regulator velocity gain 126. The regulator velocity gain 126 is applied to the combined mean velocity command 110 and estimated mean velocity 98. The regulator position gain 124 is applied to the combined mean position command 108 and estimated mean position 102. The regulator integral gain 122 is applied to an integrated signal including the combined mean position command and estimated mean position signals 114 integrated by an integrator 116, where T is the sample period.

The first actuator force command 26 is produced by combining the mean actuator force command 72 and the limited differential actuator force command 78.

The differential state regulator 66 receives the estimated differential velocity signal 148, estimated differential position signal 152 and estimated differential force 156 along with the position-related signals. In the example, since force-fight is minimized, the differential position command 56, differential velocity command 158 and differential acceleration command are assumed to be zero.

In the example, the differential state regulator 66 combines an estimated differential force command 156 with a differential feedback force command 172 to produce the differential actuator force command 74. The differential actuator force command 74 passes through a limiter 76 to provide the limited differential actuator force command 78. The differential feedback force command 172 is produced based upon the regulator integral gain 170, a regulator position gain 164 and a regulator velocity gain 162. The regulator velocity gain 162 is applied to the combined differential velocity command 158 and estimated differential velocity 148. The regulator position gain 164 is applied to the combined differential position command 56 and estimated differential position 152. The regulator integral gain 170 is applied to an integrated signal including the combined differential position command and estimated differential position signals 166 integrated by an integrator 168.

A simulation of the disclosed multi-actuator motion control system is depicted in FIGS. 5-10. The Figures demonstrate the dynamic properties of the relative state motion controller with disturbance force decoupling. In the simulation, two actuators are coupled to a synchronization ring as depicted in FIG. 1. At onset, the mean position command is transitioned from 0 to 1 normalized units of length. At time=2, equal and opposite disturbance forces $F_{da1}$ and $F_{da2}$ are applied to $EMA_1$ 18 and $EMA_2$ 20, respectively, resulting a differential force to the actuator system. At time=3, the disturbance force $F_{da1}$ on $EMA_1$ 18 is removed resulting in both mean and differential forces applied to the system. At time=4, a disturbance force is applied to the sync ring $F_{ds}$ resulting in a mean force disturbance to the actuator system.

Figure 5:
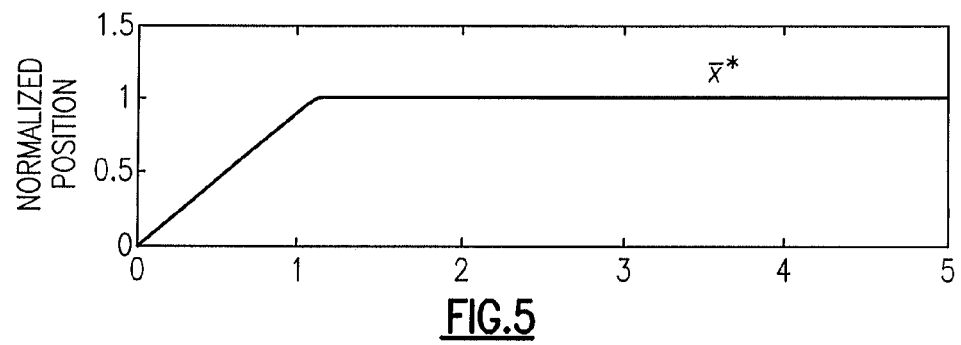
FIG. 5 is a graph of a mean position command over time.
Figure 6:
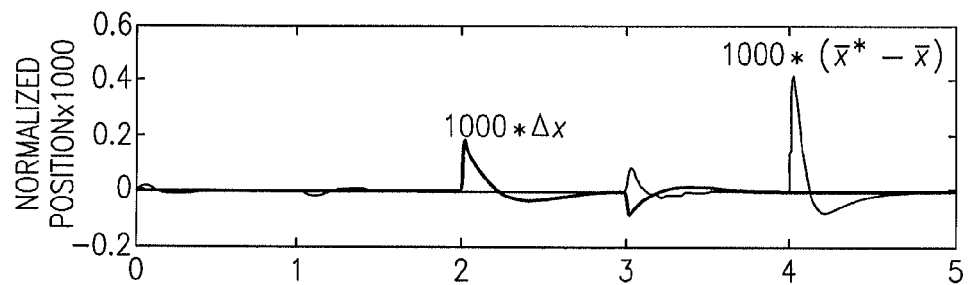
FIG. 6 is a graph of a differential position over time and a differential between a mean position command and a mean position over time.
Figure 7:
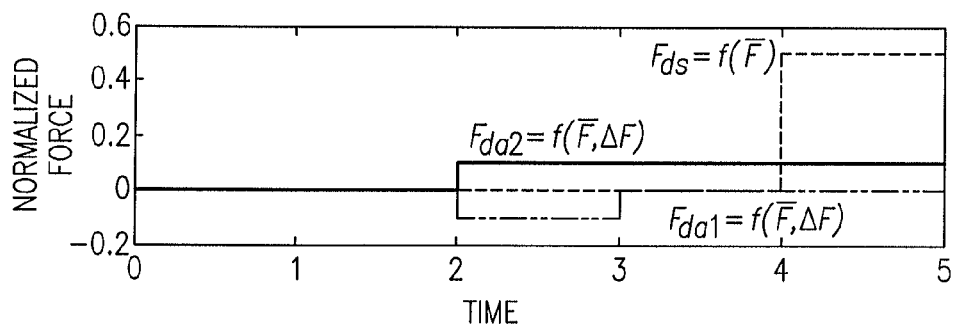
FIG. 7 is a graph of first and second actuator disturbance forces over time and disturbance forces from an actuated element over time.

The position control performance exhibits excellent command tracking and disturbance rejection properties, as shown in FIGS. 5-7. The error in both the mean and differential position is under 0.05% of the commanded position. As expected, an equal but opposite disturbance force on each actuator only affects the differential dynamics of the system (force-fight), a disturbance force on one actuator results in a transient response on both the mean and differential position states, and a disturbance force on the synchronization ring only affects the mean position state.

Figure 8:
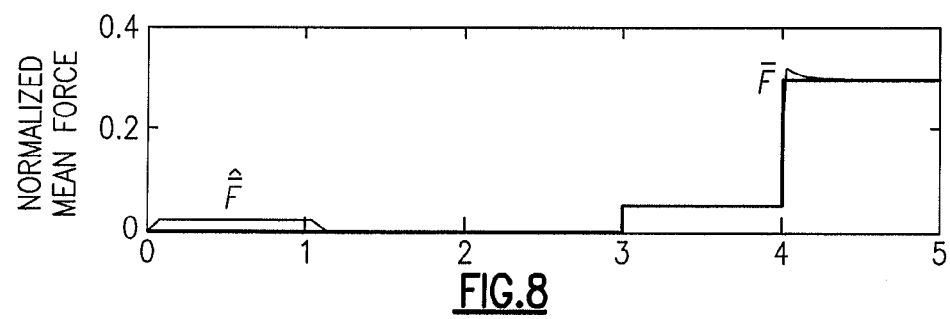
FIG. 8 is a graph of an estimated mean force over time and a mean force over time.
Figure 9:
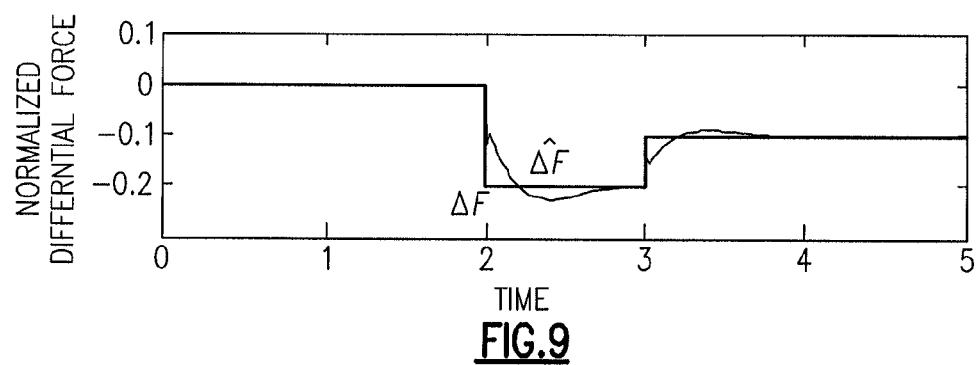
FIG. 9 is a graph of an estimated differential force over time and a differential force over time.
Figure 10:
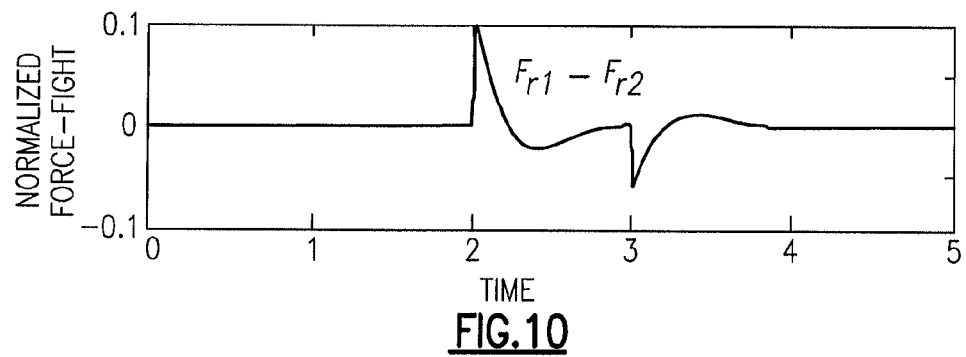
FIG. 10 is a graph of a differential between first and second actuator reaction forces over time.

The observer controllers estimates the force resulting from un-modeled components in the system within the observer bandwidth. In this example, the observer models do not include information on the sync ring model or disturbance forces. As a result, the observers estimate the applied disturbances as well as a mean force due to the acceleration of the sync ring because the sync ring mass was not considered, as shown in FIGS. 8-10. The resulting force-fight applied to the synchronization ring is eliminated. The relative position measurements of the actuators are calibrated under the condition of no force-fight.

Although an example embodiment has been disclosed, a worker of ordinary skill in this art would recognize that certain modifications would come within the scope of the claims. For that reason, the following claims should be studied to determine their true scope and content.

What is claimed is:

1. A motion control system comprising:
    first and second actuators operatively coupled to a common drive element and respectively configured to provide first and second actuator forces to the common drive element in response to an actuator request input for a desired position, wherein each of the first and second actuators include a position sensor; and
    a controller configured to include relative motion state control logic providing mean and differential motion state regulators of the first and second actuators for providing first and second actuator force command signals respectively to the first and second actuators, the controller is further configured to include reaction force observer logic providing estimated mean and differential reaction force observers respectively in communication with the mean and differential motion state regulators for estimating first and second actuator forces, the mean and differential motion state regulators minimizing a differential between the first and second actuator forces, wherein each of the first and second actuator position sensors respectively provide first and second actuator measured position signals to the controller to provide feedback as to whether the first and second actuators have achieved the desired position from the actuator request input.

2. The motion control system according to claim 1, wherein the first and second actuator measured position signals are provided to the observer control logic.

3. The motion control system according to claim 2, wherein the actuator request input provides position-related request signals to the relative motion state control logic, the first and second actuator force command signals based upon the position-related request signals.

4. The motion control system according to claim 3, wherein the position-related request signal corresponds to mean position-related command signals, comprising a mean force command that is a function of the mean position-related command signals combined with a mean command signal which corresponds to the average of the first and second actuator measured position signals.

5. The motion control system according to claim 4, comprising a differential force command that is a function of a differential position command signal combined with a differential position signal that corresponds to the difference of the first and second actuator measured position signals.

6. The motion control system according to claim 5, wherein the differential position command signal is zero.

7. The motion control system according to claim 4, wherein the first and second actuator force command signals are based upon the combination of the mean and differential force command signals.

8. The motion control system according to claim 2, wherein the first and second actuator force command signals are based upon cross-coupled first and second actuator measured position signals and cross-coupled mean and differential force command signals, which are respectively a function of mean and differential position-related command signals.

9. The motion control system according to claim 1, wherein the reaction force observer logic calculates estimated position-related signals and estimated force signals based upon mean and differential position signals and mean and differential actuator force command signals, the estimated position-related signals and estimated force signals communicated to the relative motion state control logic.

10. The motion control system according to claim 9, wherein the estimated force signals are a function of actuator reaction and disturbance forces, measured position signals, commanded force signals and estimated equivalent mass.

11. The motion control system according to claim 9, wherein the reaction force observer logic includes PID controllers receiving mean and differential position signals and mean and differential actuator force command signals and operative producing the estimated position-related signals and estimated force signals.

12. The motion control system according to claim 11, wherein the reaction force observer logic applies gain coefficients and estimated equivalent mass signals to the position signals and actuator force command signals to produce the estimated position-related signals and estimated force signals.

13. The motion control system according to claim 1, wherein the relative motion state control logic produces actuator force command signals based upon estimated position-related signals and estimated force signals.

14. The motion control system according to claim 13, wherein the regulators include gain coefficients applied to position and velocity signals to provide products of the position and velocity signals, the products are summed to provide a feedback force command signal that is summed with the estimated force signal to provide the actuator force command signal.

15. The motion control system according to claim 14, wherein the regulators include an integrator receiving an estimated position signal producing an integrated signal communicated to the integral gain coefficient.

16. The motion control system according to claim 1, wherein the controller is provided by a single unit.

17. The motion control system according to claim 1, wherein the controller is shared by the first and second actuators, each of the first and second actuator measured position signals are used to provide feedback to the shared controller as to whether the first and second actuators have achieved the desired position from the actuator request input.

* * * * *